(12) United States Patent
Huang et al.

(10) Patent No.: US 7,930,113 B1
(45) Date of Patent: Apr. 19, 2011

(54) MEASURING STRESSES IN MULTI-LAYER THIN FILM SYSTEMS WITH VARIABLE FILM THICKNESS

(75) Inventors: Yonggang Huang, Champaign, IL (US); Ares J. Rosakis, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 254 days.

(21) Appl. No.: 12/105,238

(22) Filed: Apr. 17, 2008

Related U.S. Application Data

(60) Provisional application No. 60/923,853, filed on Apr. 17, 2007, provisional application No. 61/067,259, filed on Feb. 27, 2008.

(51) Int. Cl.
*G01L 1/00* (2006.01)

(52) U.S. Cl. ........................................................ 702/42

(58) Field of Classification Search ...................... 702/42
See application file for complete search history.

(56) References Cited

U.S. PATENT DOCUMENTS

| | | | |
|---|---|---|---|
| 5,555,471 A | 9/1996 | Xu et al. | |
| 5,710,631 A | 1/1998 | Bou-Ghannam et al. | |
| 6,031,611 A | 2/2000 | Rosakis et al. | |
| 6,268,883 B1 | 7/2001 | Zehnder et al. | |
| 6,469,788 B2 | 10/2002 | Boyd et al. | |
| 6,513,389 B2 | 2/2003 | Suresh et al. | |
| 6,600,565 B1 | 7/2003 | Suresh et al. | |
| 6,781,702 B2 | 8/2004 | Giannakopoulos et al. | |
| 6,924,497 B2 | 8/2005 | Suresh et al. | |
| 7,363,173 B2 | 4/2008 | Rosakis et al. | |
| 7,418,353 B2 * | 8/2008 | Lovell et al. | 702/42 |
| 7,487,050 B2 * | 2/2009 | Rosakis et al. | 702/42 |
| 7,538,891 B1 | 5/2009 | Mello et al. | |
| 2002/0012122 A1 | 1/2002 | Boyd et al. | |
| 2003/0086156 A1 | 5/2003 | McGuire, Jr. | |
| 2003/0106378 A1 | 6/2003 | Giannakopoulos et al. | |
| 2003/0190131 A1 | 10/2003 | Barth | |
| 2004/0075825 A1 | 4/2004 | Suresh et al. | |
| 2004/0257587 A1 | 12/2004 | Rosakis et al. | |
| 2005/0007601 A1 | 1/2005 | Rosakis et al. | |
| 2005/0030551 A1 | 2/2005 | Rosakis et al. | |
| 2005/0278126 A1 | 12/2005 | Rosakis et al. | |

(Continued)

FOREIGN PATENT DOCUMENTS

JP 05-335217 12/1993

OTHER PUBLICATIONS

Brown, M., et al., "A Comparison of X-Ray Microdiffraction and Coherent Gradient Sensing in Measuring Discontinuous Curvatures in Thin Film-Substrate Systems," *Journal of Applied Mechanics*, 73(5):723-729, Sep. 2006.

(Continued)

*Primary Examiner* — Drew A Dunn
*Assistant Examiner* — Xiuquin Sun
(74) *Attorney, Agent, or Firm* — Perkins Coie LLP

(57) ABSTRACT

Systems are described that include computer program products that enable data processing apparatus to perform operations to determine stresses for a system including a substrate with a plurality of films layered thereon. The operations include determining film stresses and system curvatures in terms of misfit strains and thicknesses the plurality of films, determining film stresses and interface shear stresses in terms of system curvature and the thicknesses of each film, and transmitting the film stresses and the interface shear stresses to a computer-readable medium.

21 Claims, 5 Drawing Sheets

U.S. PATENT DOCUMENTS

2006/0276977 A1 12/2006 Rosakis et al.
2007/0180919 A1 8/2007 Rosakis et al.

OTHER PUBLICATIONS

Brown, M.A., et al., "Thin film/substrate systems featuring arbitrary film thickness and misfit strain distributions. Part II: Experimental validation of the non-local stress/curvature relations," *International Journal of Solids and Structures*, 44(6):1755-1767, Mar. 2007.

Feng, X., et al., "Multi-layer thin films/substrate system subjected to non-uniform misfit strains," *International Journal of Solids and Structures*, 45(13):3688-3698, Jun. 2008.

Feng, X., et al., "On the Stoney Formula for a Thin Film/Substrate System With Non-Uniform Substrate Thickness," *Journal of Applied Mechanics*, 74(6):1276-1281, Nov. 2007.

Feng, X., et al., "Stresses in a Multilayer Thin Film/Substrate System Subjected to Nonuniform Temperature," *Journal of Applied Mechanics*, 75(2):021022.1-021022.7, Mar. 2008.

Feng, X., et al., "The effect of thin film/substrate radii on the Stoney formula for thin film/substrate subjected to non-uniform axisymmetric misfit strain and temperature," *Journal of Mechanics of Materials and Structures*, 1(6):1041-1053, Jun. 2006.

Finot, M., et al., "Large deformation and geometric instability of substrates with thin-film deposits", *J. Appl. Phys.*, 81(8):3457-3464, Apr. 1997.

Finot, M., et al., "Small and large deformation of thick and thin-film multi-layers: Effect of layer geometry, plasticity and compositional gradients", *J. Mech. Phys. Solids*, 44(5):683-721, May 1996.

Freund, L.B., "Substrate curvature due to thin film mismatch strain in the nonlinear deformation range", *J. Mech. Phys. Solids*, 48(6-7):1159-1174, Jun. 2000.

Huang, Y., et al., "Anisotropic, non-uniform misfit strain in a thin film bonded on a plate substrate," *Interaction and Multiscale Mechanics*, 1(1):123-142, (2007).

Huang, Y., et al., "Extension of Stoney's Formula to Arbitrary Temperature Distributions in Thin Film/Substrate Systems," *Journal of Applied Mechanics*, 74(6):1225-1233, Nov. 2007.

Huang, Y., et al., "Extension of Stoney's formula to non-uniform temperature distributions in thin film/substrate systems. The case of radial symmetry", *J. Mech. Phys. Solids*, 53(11):2483-2500, Nov. 2005.

Huang, Y., et al., "Non-uniform, axisymmetric misfit strain in thin films bonded on plate substrates/substrate systems: the relation between non-uniform film stresses and system curvatures", *Acta Mechanica Sinica*, 21(4):362-370, Aug. 2005.

Lee, H., et al., "Full-field optical measurement of curvatures in ultra-thin-film-substrate systems in the range of geometrically nonlinear deformations", *J. Appl. Phys.*, 89(11):6116-6129, Jun. 2001.

Masters, C.B., et al., "Geometrically nonlinear stress-deflection relations for thin film/substrate systems", *Int. J. Eng. Sci*, 31(6):915-925, (1993).

Ngo, D., et al., "Spatially non-uniform, isotropic misfit strain in thin films bonded on plate substrates: The relation between non-uniform film stresses and system curvatures," *Thin Solid Films*, 515(4):2220-2229, Dec. 2006.

Ngo, D., et al., "Thin Film/Substrate Systems Featuring Arbitrary Film Thickness and Misfit Strain Distributions. Part I: Analysis for Obtaining Film Stress from Non-Local Curvature Information," *International Journal of Solids and Structures*, 44(6):1745-1754, Mar. 2007.

Park, T.-S., et al., "Effects of line and passivation geometry on curvature evolution during processing and thermal cycling in copper interconnect lines", *Acta Materialia*, 48(12):3169-3175, Jul. 2000.

Park, T.-S., et al., "Measurement of full-field curvature and geometrical instability of thin film-substrate systems through CGS interferometry", *J. Mech. Phys. Solids*, 51(11-12):2191-2211, Nov.-Dec. 2003.

Rosakis, A.J., et al., "Full field measurements of curvature using coherent gradient sensing: application to thin film characterization", *Thin Solid Films*, 325(1-2):42-54, Jul. 1998.

Salamon, N.J., et al., "Bifurcation in isotropic thin film/substrate plates", *Int. J. Solids Structures*, 32(3):473-481, Feb. 1995.

Shen, Y.L., et al., "Stresses, curvatures, and shape changes arising from patterned lines on silicon wafers", *J. Appl. Phys.*, 80(3):1388-1398, Aug. 1996.

Stoney, G.G., "The tension of metallic films deposited by electrolysis", *Proceedings of the Royal Society of London*, 82(553):172-175, May 1909.

Wikstrom, A., et al., "Analysis of average thermal stresses in passivated metal interconnects", *J. Appl. Phys.*, 86(11):6088-6095, Dec. 1999.

Wikstrom, A., et al., "Thermoelastic Analysis of Periodic Thin Lines Deposited on a Substrate", *J. Mech. Phys. Solids*, 47(5):1113-1130, Apr. 1999.

\* cited by examiner

MEASURING STRESSES IN MULTI-LAYER THIN FILM SYSTEMS WITH VARIABLE FILM THICKNESS

CROSS-REFERENCE TO RELATED APPLICATIONS

This application claims benefits of U.S. Provisional Application No. 60/923,853 entitled "Multi-Layer Thin Films/Substrate System Subjected to Non-Uniform Misfit Strains" and filed on Apr. 17, 2007 and U.S. Provisional Application No. 61/067,259 entitled "Multi-Layer Thin Films/Substrate System with Variable Film Thickness Subjected to Non-Uniform Misfit Strains" and filed on Feb. 27, 2008, which are incorporated by reference as part of the specification of this application.

TECHNICAL FIELD

The present disclosure relates to stresses in systems including thin films, e.g., multi-layer thin films of non-uniform thickness.

BACKGROUND

Substrates formed of suitable solid-state materials may be used as platforms to support various structures, such as layered or graded panels, and multilevel, thin film microstructures deposited on the substrates. Integrated electronic circuits, integrated optical devices and opto-electronic circuits, micro-electro-mechanical systems (MEMS) deposited on wafers, three-dimensional electronic circuits, system-on-chip structures, lithographic reticles, and flat panel display systems (e.g., LCD and plasma displays) are examples of such structures integrated on various types of plate substrates. Substrates may be made of semiconductor materials (e.g., silicon wafers), silicon on insulator wafers (SOIs), amorphous or glass materials, polymeric or organic materials, and others. Different thin material layers or different structures may be formed on the same substrate in these structures and are in contact with one another to form various interfaces with adjacent structures and with the substrate. Some devices may use complex multilayer or continuously graded geometries. In addition, some devices may form various three dimensional structures.

The above and other structures on substrates may be made from a multiplicity of fabrication and processing steps and thus may experience stresses caused by these steps, such as deposition or thermal stresses. Examples of known phenomena and processes that build up stresses in thin films include but are not limited to, lattice mismatch, chemical reactions, doping by, e.g., diffusion or implantation, rapid deposition by evaporation or sputtering, and material removal (e.g. CMP or etch). As another example, a metallization process in fabricating integrated circuits may produce multiple layers on a semiconductor substrate (e.g., silicon), often at elevated temperatures. The multiple layers may include a mixture of metal and dielectric films which usually exhibit different mechanical, physical and thermal properties from those of the underlying substrate or wafer. Hence, such multiple layers can lead to high stresses in the film layers in the interconnection structures. These stresses can cause undesired stress-induced voiding in the metal interconnects and are directly related to electromigration. In addition, the stresses may cause cracking of some films and even delamination between various film layers, between interconnects and the encapsulating dielectrics, and between the films and the substrate. It is known that metal voiding, electromigration, cracking and delamination are among the leading causes for loss of subsequent process yield and failures in integrated circuits. Therefore, these and other stresses may adversely affect the structural integrity and operations of the structures or devices, and the lifetimes of such structures or devices. Hence, the identification of the origins of the stress build-up, the accurate measurement and analysis of stresses, and the acquisition of information on the spatial distribution of such stresses are important in designing and processing the structures or devices and to improving the reliability and manufacturing yield of various layered structures.

Stresses in layered thin-film structures deposited on plate substrates may be calculated from the substrate curvature or "bow" based on a correlation between changes in the curvature and stress changes at the same location. Early attempts to provide such correlation are well known. Various formulations have been developed for measurements of stresses in thin films and most of these formulations are essentially based on extensions of Stoney's approximate plate analysis published in Proceedings of the Royal Society, London, Series A, vol. 82, pp. 172(1909). Stoney studied a thin film deposited on a relatively thick substrate, and derived the Stoney formula to give the relation between the system curvature κ and the film stress $\sigma^{(f)}$, $$\sigma^{(f)} = \frac{E_s h_s^2 \kappa}{6 h_f (1 - v_s)}, \quad (1.1)$$

where the subscripts "f" and "s" denote the thin film and substrate, respectively, and E, v and h are the Young's modulus, Poisson's ratio and thickness. Equation (1.1) has been extensively used to infer film stress changes from experimental measurement of system curvature changes.

Stoney's formula was based on the following assumptions, some of which have been relaxed: (i) Both the film thickness $h_f$ and the substrate thickness $h_s$ are uniform and $h_f \ll h_s \ll R$, where R represents the characteristic length in the lateral direction (e.g., system radius R shown in FIG. 1). This assumption was recently relaxed for the thin film and substrate of different radii, arbitrarily non-uniform film thickness and substrate thickness. These analytical results have been verified by the X-ray microdiffraction experiments; (ii) The strains and rotations of the plate system are infinitesimal. This assumption has been relaxed by various "large" deformation analyses, some of which have been validated by experiments; (iii) Both the film and substrate are homogeneous, isotropic, and linearly elastic. To our best knowledge this assumption has not been relaxed yet. (iv) The film stress states are equi-biaxial ($\sigma_{xx} = \sigma_{yy}, \sigma_{xy} = 0$) while the out-of-plane direct stress and all shear stresses vanish ($\sigma_{zz} = \sigma_{xz} = \sigma_{yz} = 0$). This assumption has been relaxed for non-equi-biaxial but constant stress states, and recently to non-equi-biaxial and spatially non-uniform stress states; (v) The system's curvature components are equi-biaxial ($\kappa_{xx} = \kappa_{yy}$) while the twist curvature vanishes $\kappa_{xy} = 0$. This assumption has been relaxed for non-equi-biaxial but constant curvature components and non-vanishing (but constant) twist components, and recently for non-equi-biaxial and non-constant curvature components; (vi) All surviving stress and curvature components are spatially constant over the plate system's surface, a situation that is often violated in practice. Recently this assumption was relaxed for the thin film/substrate system subjected to non-uniform, axisymmetric misfit strain (in thin film) and temperature change (in both thin film and substrate), respectively, while the thin film/substrate system subject to arbitrarily non-uniform (e.g., non-axisymmetric) misfit strain and temperature was also studied. Their most important result is that the film stresses depend non-locally on the system curvatures, i.e., they depend on curvatures of the entire system.

Despite the explicitly stated assumptions of spatial stress and curvature uniformity, the Stoney formula is often, arbitrarily, applied to cases of practical interest where these assumptions are violated. This is typically done by applying Stoney's formula pointwise and thus extracting a local value of stress from a local measurement of the curvature of the system. This approach of inferring film stress clearly violates the uniformity assumptions of the analysis and, as such, its accuracy as an approximation deteriorates as the levels of curvature non-uniformity become more severe. For example, X-ray diffraction experiments showed that the Stoney formula may underestimate the film stress by 50%.

Many thin film/substrate systems involve multiple layers of thin films. The Stoney formula was extended for multi-layer thin films subjected to non-uniform misfit strains and temperature, respectively. But they still assumed constant thickness of each film. But in applications the multi-layer thin films often have non-constant thickness, such as films forming an "island" on the substrate. Current methodologies used for the inference of thin film stress through curvature measurement are strictly restricted to stress and curvature states that are assumed to remain uniform over the entire film/substrate system. These methodologies have recently been extended to a single thin film of non-uniform thickness deposited on a substrate subjected to the non-uniform misfit strain in the thin film.

SUMMARY

This specification describes technologies relating to measuring stresses in multi-layer thin film systems with variable film thickness. This disclosure extends previously performed work to multi-layer thin films of arbitrarily thickness on a substrate subjected to non-uniform misfit strain distribution. We will relate stresses in each film and system curvatures to the misfit strain and film thickness distributions, and ultimately derive a relation between the stresses in each film and system curvatures that would allow for the accurate experimental inference of film stresses from full-field and real-time curvature measurements.

In one aspect, a computer-implemented method to determine stress in a multi-layer thin film system is described. For a system comprising a substrate with multiple films layered thereon, the method includes determining film stresses and system curvatures in terms of misfit strains and thicknesses of the plurality of films. The method also includes determining film stresses and interface shear stresses in terms of system curvature and the thickness of each film, and transmitting the film stresses and the interface shear stresses to a computer-readable medium.

This, and other aspects, can include one or more of the following features. Determining the film stresses and the interface shear stresses can include determining a solution for a linear elastic constitutive model developed based on Stoney's formula. The method can include determining forces and bending moments in the substrate from the linear elastic constitutive model. The method can include determining shear stresses between two films of the plurality of films. The method can include developing a relationship between misfit strains and system curvatures. The system can include determining a sum of stresses in the plurality of films in terms of the system curvature. Determining the interface stresses can include determining an interface stress between the substrate and a first film. The system can include one or more islands of films, wherein an island of film can include films layered on a region that occupies less than all of the substrate surface. A thickness of the film on an island can be uniform. The features of this disclosure can be implemented in systems including computer program products tangibly embodied in computer-readable media that cause data processing apparatus to perform the methods described.

Particular implementations of the subject matter described in this specification can be implemented to realize one or more of the following advantages. Integrated electronic circuits, integrated optical devices and opto-electronic circuits, micro-electro-mechanical systems (MEMS) deposited on wafers, three-dimensional electronic circuits, system-on-chip structures, lithographic reticles, and flat panel display systems (e.g., LCD and plasma displays) are examples of structures that include multiple thin films deposited on substrates. The thin films can be deposited over the entire substrate or, alternatively, islands of thin films can be formed on one or more regions of a substrate. The manufacturing processes by which the thin films are deposited on the substrate will invariably result in variations in thicknesses not only between multiple thin films but also within different regions of the same thin film. This disclosure allows studying the stresses on each film layered on a substrate individually and in unison. Because the techniques described in this disclosure treat the stresses on the substrate system as a function of non-local curvatures and because a full-field measurement of the experimental inference of stresses is made, the stress on each thin film deposited on the substrate is monitored, and the reliability of the system is increased. The techniques described here enable testing individual thin film layers during the fabrication process to identify defective films rather than having to wait for functional testing performed after fabrication. The analysis described provides an analytical solution to determine film stresses and interface shear stresses in a system including multiple thin films on a substrate. Such an analytical solution decreases the time that it would take computational methods to arrive at the same results, while also increasing the reliability of the result itself.

The details of one or more implementations of the disclosure are set forth in the accompanying drawings and the description below. Other features, aspects, and advantages of the disclosure will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes methodologies for the inference of thin film stress through curvature measurement in multilayer thin films of non-uniform thickness deposited on a substrate, where each thin film can have its own non-uniform misfit strain and non-uniform thickness. The film stresses and system curvatures are obtained in terms of the misfit strains and thickness in thin films. Subsequently, the film stresses and interface shear stresses are derived in terms of system curvatures and film thicknesses. The derived stresses feature a non-local dependence on curvature, which makes a full-field measurement important for the experimental inference of such stresses.

Figure 1:
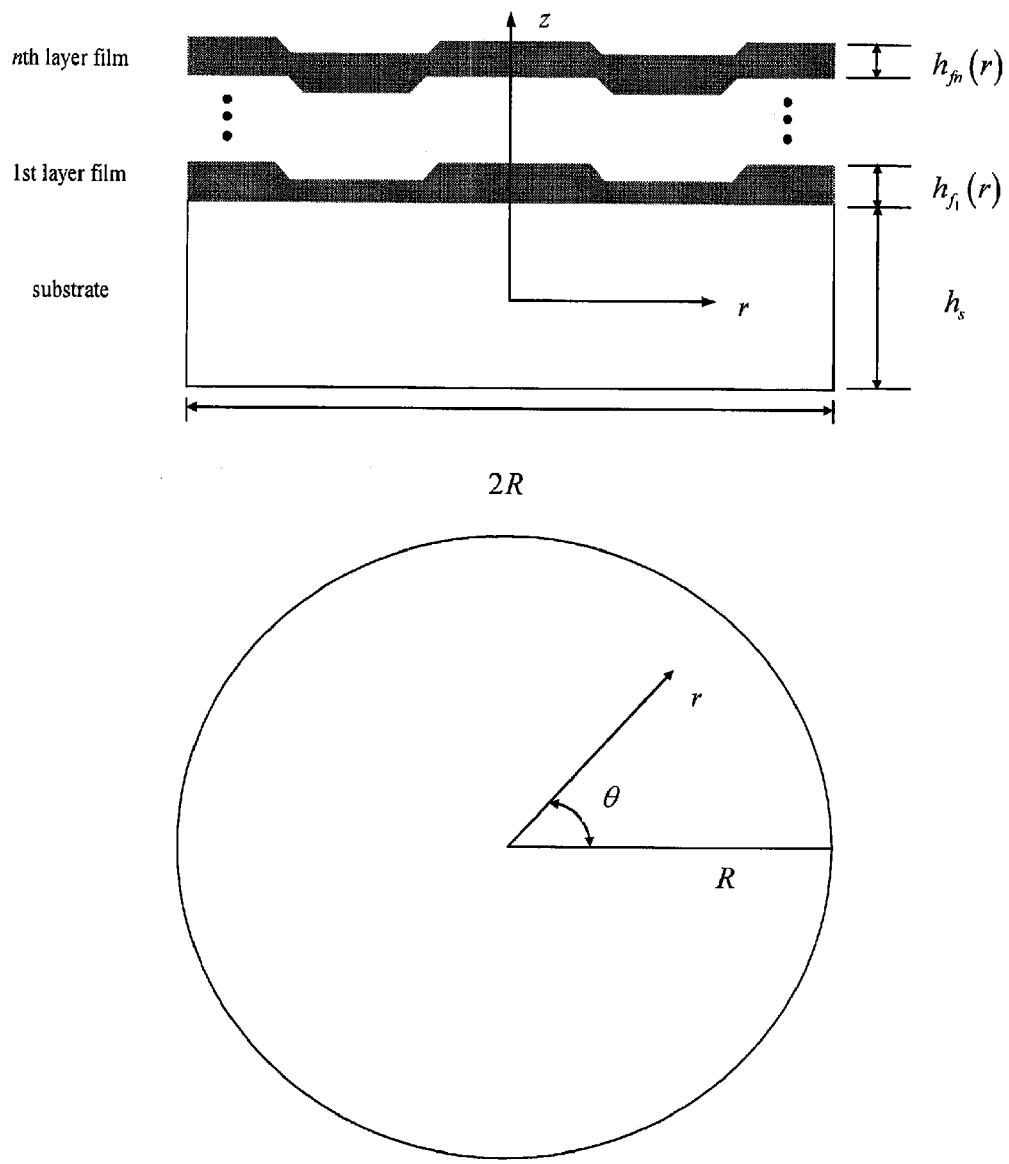
FIG. 1 is a system including a substrate with n layers of films.

The development of an analytical solution for interface stress between a substrate and a first thin film, and between thin films subjected to non-uniform misfit strains and thicknesses is described. First, a system of multi-layer thin films of variables thickness deposited on a substrate subjected to non-uniform misfit strain distribution $\epsilon_m^{(i)}$ in the $i^{th}$ layer (i=1, 2, . . . n), is considered, where n is the total number of layers of thin films (FIG. 1). For simplicity the misfit strain and film thickness are taken as axisymmetric, $\epsilon_m^{(i)} = \epsilon_m^{(i)}(r)$ and $h_{f_i} = h_{f_i}(r)$ where r is the radial coordinate. The thin films and substrate are circular in the lateral direction and have a radius R. The deformation is axisymmetric and is therefore independent of the polar angle $\theta$.

The total thickness of all n films is $$h_f(r) = \sum_{i=1}^{n} h_{f_i}(r).$$

The Young's modulus and Poisson's ratio of the $i^{th}$ thin film and substrate are denoted by $E_{f_i}$, $v_{f_i}$, $E_s$ and $v_s$, respectively. The thin films are modeled as membranes since they have negligible bending rigidities. They all have the same in-plane displacement $u_f(r)$ in the radial (r) direction, which give the strains $$\varepsilon_{rr} = \frac{du_f}{dr} \text{ and } \varepsilon_{\theta\theta} = \frac{u_f}{r}.$$

The stresses in the $i^{th}$ thin film can be obtained from the linear elastic constitutive model as $$\sigma_{rr}^{(f_i)} = \frac{E_{f_i}}{1 - v_{f_i}^2}\left[\frac{du_f}{dr} + v_{f_i}\frac{u_f}{r} - (1 + v_{f_i})\varepsilon_m^{(i)}\right] \quad (2.1)$$

$$\sigma_{\theta\theta}^{(f_i)} = \frac{E_{f_i}}{1 - v_{f_i}^2}\left[v_{f_i}\frac{du_f}{dr} + \frac{u_f}{r} - (1 + v_{f_i})\varepsilon_m^{(i)}\right]$$

The membrane forces in the $i^{th}$ thin film are $$N_r^{(f_i)} = h_{f_i}\sigma_{rr}^{(f_i)}, \quad N_\theta^{(f_i)} = h_{f_i}\sigma_{\theta\theta}^{(f_i)}. \quad (2.2)$$

Figure 2:
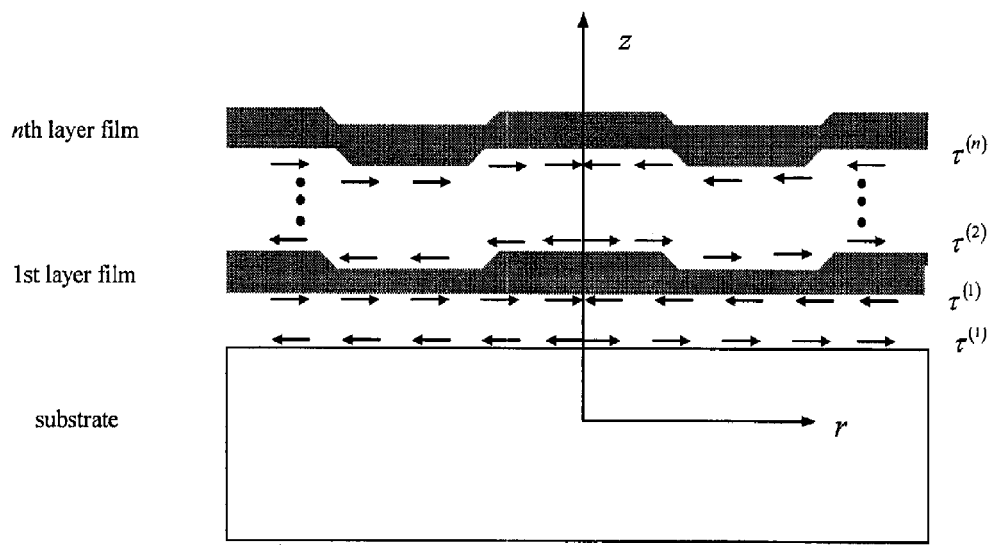
FIG. 2 illustrates shear stress tractions along film/film and film/substrate interfaces.

The shear stress tractions along the film/film and film/substrate interfaces are denoted by $\tau^{(i)}(r)(i=1, 2, \ldots n)$ as shown in FIG. 2. The normal stress tractions are negligible since thin films have no bending rigidities. The equilibrium equations for thin films, accounting for the effect of interface shear stress tractions, become $$\frac{dN_r^{(f_i)}}{dr} + \frac{N_r^{(f_i)} - N_\theta^{(f_i)}}{r} - (\tau^{(i)} - \tau^{(i+1)}) = 0, \quad (2.3)$$

where $\tau^{(n+1)} = 0$ for the traction free surface. Substitution of Eqs. (2.1) and (2.2) into (2.3) and the summation of its left hand side yield $$\sum_{i=1}^{n} \frac{E_{f_i} h_{f_i}}{1 - v_{f_i}^2} \cdot \left(\frac{d^2 u_f}{dr^2} + \frac{1}{r}\frac{du_f}{dr} - \frac{u_f}{r^2}\right) + \quad (2.4)$$

$$\sum_{i=1}^{n} \frac{E_{f_i}}{1 - v_{f_i}^2}\frac{dh_{f_i}}{dr}\left(\frac{du_f}{dr} + v_{f_i}\frac{u_f}{r}\right) = \tau^{(1)} + \sum_{i=1}^{n} \frac{E_{f_i}}{1 - v_{f_i}^2}\frac{d}{dr}(h_{f_i}\varepsilon_m^{(i)}).$$

The substrate has a constant thickness such that its governing equations are the same as Huang et al. (2005). Let $u_s$ denote the displacement in the radial (r) direction at the neutral axis of the substrate, and w the displacement in the normal (z) direction. The forces and bending moments in the substrate are obtained from the linear elastic constitutive model as $$N_r^{(s)} = \frac{E_s h_s}{1 - v_s^2}\left(\frac{du_s}{dr} + v_s\frac{u_s}{r}\right), \quad (2.5)$$

$$N_\theta^{(s)} = \frac{E_s h_s}{1 - v_s^2}\left(v_s\frac{du_s}{dr} + \frac{u_s}{r}\right)$$

$$M_r = \frac{E_s h_s^3}{12(1 - v_s^2)}\left(\frac{d^2 w}{dr^2} + \frac{v_s}{r}\frac{dw}{dr}\right) \quad (2.6)$$

$$M_\theta = \frac{E_s h_s^3}{12(1 - v_s^2)}\left(v_s\frac{d^2 w}{dr^2} + \frac{1}{r}\frac{dw}{dr}\right).$$

The shear stress $\tau^{(1)}$ at the thin film/substrate interface is equivalent to the distributed axial force $\tau^{(1)}$ and bending moment $$\frac{h_s}{2}\tau^{(1)}$$

applied at the neutral axis of the substrate. The in-plane force equilibrium equation of the substrate then becomes $$\frac{dN_r^{(s)}}{dr} + \frac{N_r^{(s)} - N_\theta^{(s)}}{r} + \tau^{(1)} = 0. \quad (2.7)$$

The out-of-plane force and moment equilibrium equations are given by $$\frac{dM_r}{dr} + \frac{M_r - M_\theta}{r} + Q - \frac{h_s}{2}\tau^{(1)} = 0, \quad (2.8)$$

$$\frac{dQ}{dr} + \frac{Q}{r} = 0, \quad (2.9)$$

where Q is the shear force normal to the neutral axis. Substitution of Eq. (2.5) into (2.7) yields $$\frac{d^2 u_s}{dr^2} + \frac{1}{r}\frac{du_s}{dr} - \frac{u_s}{r^2} = -\frac{1 - v_s^2}{E_s h_s}\tau^{(1)}. \quad (2.10)$$

Elimination of Q from Eqs. (2.8) and (2.9), in conjunction with Eq. (2.6), gives $$\frac{d^3 w}{dr^3} + \frac{1}{r}\frac{d^2 w}{dr^2} - \frac{1}{r^2}\frac{dw}{dr} = \frac{6(1-v_s^2)}{E_s h_s^2}\tau^{(1)}. \tag{2.11}$$

The continuity of displacement across the thin film/substrate interface requires $$u_f = u_s - \frac{h_s}{2}\frac{dw}{dr}. \tag{2.12}$$

Equations (2.4) and (2.10)-(2.12) constitute four ordinary differential equations for $u_f$, $u_s$, w and $\tau^{(1)}$.

The terms, $u_f$, $u_s$ and w, can be eliminated from these four equations to obtain the shear stress $\tau^{(1)}$ at the thin film/substrate interface in terms of the misfit strains. For the film thickness $h_f \ll h_s$, $\tau^{(1)}$ and the shear stresses $\tau^{(i)}$ (i=2, 3, ... n) between thin films $$\tau^{(i)} = -\sum_{j=i}^{n} \frac{E_{f_j}}{1-v_{f_j}}\frac{d}{dr}(h_{f_j}\varepsilon_m^{(j)}). \tag{2.13}$$

This result holds regardless of boundary conditions at the edge r=R. Therefore, the interface shear stress is proportional to the gradient of the product of misfit strains and film thickness. For uniform misfit strains $\varepsilon_m^{(i)}(r)$=constant and constant thickness $h_{f_i}(r)$=constant, the interface shear stress vanishes, i.e., $\tau^{(i)}$=0.

Substitution of the above solution for shear stress $\tau^{(1)}$ into Eqs. (2.11) and (2.10) yields ordinary differential equations for displacements w and $u_s$ in the substrate. The boundary conditions at the free edge r=R are the vanishing of net force $$\sum_{i=1}^{n} N_r^{(f_i)} + N_r^{(s)} = 0$$

and net moment $$M_r - \frac{h_s}{2}\sum_{i=1}^{n} N_r^{(f_i)} = 0.$$

Their solutions, at the limit of $h_f \ll h_s$, are $$\frac{dw}{dr} = -6\frac{1-v_s^2}{E_s h_s^2}\frac{1}{r}\int_0^r \eta \sum_{i=1}^{n} \frac{E_{f_i}}{1-v_{f_i}}(h_{f_i}\varepsilon_m^{(i)})d\eta - \tag{2.14}$$

$$6\frac{(1-v_s)^2}{E_s h_s^2}\frac{r}{2}\sum_{i=1}^{n}\frac{E_{f_i}}{1-v_{f_i}}\overline{h_{f_i}\varepsilon_m^{(i)}},$$

-continued $$u_s = \frac{1-v_s^2}{E_s h_s^2}\frac{1}{r}\int_0^r \eta \sum_{i=1}^{n} \frac{E_{f_i}}{1-v_{f_i}}(h_{f_i}\varepsilon_m^{(i)})d\eta + \tag{2.15}$$

$$\frac{(1-v_s)^2}{E_s h_s^2}\frac{r}{2}\sum_{i=1}^{n}\frac{E_{f_i}}{1-v_{f_i}}\overline{h_{f_i}\varepsilon_m^{(i)}},$$

where $$\overline{h_{f_i}\varepsilon_m^{(i)}} = \frac{2}{R^2}\int_0^R \eta(h_{f_i}\varepsilon_m^{(i)})d\eta \frac{\iint h_{f_i}\varepsilon_m^{(i)}dA}{\pi R^2}$$

is the average of the product of misfit strain and thickness in the i$^{th}$ thin film. The displacement $u_f$ in the film is obtained from the continuity condition (2.12) across the interface as $$u_f = 4\frac{1-v_s^2}{E_s h_s^2}\frac{1}{r}\int_0^r \eta \sum_{i=1}^{n} \frac{E_{f_i}}{1-v_{f_i}}(h_{f_i}\varepsilon_m^{(i)})d\eta + \tag{2.16}$$

$$4\frac{(1-v_s)^2}{E_s h_s^2}\frac{r}{2}\sum_{i=1}^{n}\frac{E_{f_i}}{1-v_{f_i}}\overline{h_{f_i}\varepsilon_m^{(i)}}.$$

The system curvatures are related to the out-of-plane displacement w by $$\kappa_{rr} = \frac{d^2 w}{dr^2} \text{ and } \kappa_{\theta\theta} = \frac{1}{r}\frac{dw}{dr}.$$

The sum of these two curvatures is $$\kappa_{rr} + \kappa_{\theta\theta} = -12\frac{1-v_s}{E_s h_s^2}\sum_{i=1}^{n}\frac{E_{f_i}}{1-v_{f_i}}\left[\overline{h_{f_i}\varepsilon_m^{(i)}} + \frac{1+v_s}{2}\left(h_{f_i}\varepsilon_m^{(i)} - \overline{h_{f_i}\varepsilon_m^{(i)}}\right)\right]. \tag{2.17}$$

The difference between two system curvatures is $$\kappa_{rr} - \kappa_{\theta\theta} = -6\frac{1-v_s}{E_s h_s^2}\sum_{i=1}^{n}\frac{E_{f_i}}{1-v_{f_i}}\left[h_{f_i}\varepsilon_m^{(i)} - \frac{2}{r^2}\int_0^r \eta(h_{f_i}\varepsilon_m^{(i)})d\eta\right]. \tag{2.18}$$

The sum and difference of stresses in each thin film are given by $$\sigma_{rr}^{(f_i)} + \sigma_{\theta\theta}^{(f_i)} = \frac{E_{f_i}}{1-v_{f_i}}(-2\varepsilon_m^{(i)}), \tag{2.19}$$

$$\sigma_{rr}^{(f_i)} - \sigma_{\theta\theta}^{(f_i)} = \tag{2.20}$$

$$4\frac{E_{f_i}}{1+v_{f_i}}\frac{1-v_s}{E_s h_s}\sum_{j=1}^{n}\frac{E_{f_i}}{1-v_{f_i}}\left[h_{f_i}\varepsilon_m^{(j)} - \frac{2}{r^2}\int_0^r \eta(h_{f_i}\varepsilon_m^{(i)})(\eta)d\eta\right].$$

It is noted that $\sigma_{rr}^{(f_i)} - \sigma_{\theta\theta}^{(f_i)}$ is in general much smaller than $\sigma_{rr}^{(f_i)} + \sigma_{\theta\theta}^{(f_i)}$ for thin films, $h_f/h_s \ll 1$.

The Stoney formula is extended for a multi-layer thin film of non-constant thickness on a substrate subjected to non-uniform misfit strains by establishing the direct relation between the stresses in each thin film and system curvatures. Both $\kappa_{rr}-\kappa_{\theta\theta}$ in Eq. (2.18) and $\sigma_{rr}^{(fi)}-\sigma_{\theta\theta}^{(fi)}$ in Eq. (2.20) are proportional to $$\sum_{i=1}^{n} \frac{E_{f_i}}{1-v_{f_i}}\left[h_{f_i}\varepsilon_m^{(i)} - \frac{2}{r^2}\int_0^r \eta(h_{f_i}\varepsilon_m^{(j)})d\eta\right].$$

Elimination of misfit strains gives $\sigma_{rr}^{(fi)}-\sigma_{\theta\theta}^{(fi)}$ in each film directly proportional to the difference $\kappa_{rr}-\kappa_{\theta\theta}$ in system curvatures, $$\sigma_{rr}^{(fi)} - \sigma_{\theta\theta}^{(fi)} = -\frac{2E_{f_i}h_s}{3(1+v_{f_i})}(\kappa_{rr}-\kappa_{\theta\theta}). \quad (2.21)$$

This result holds regardless of the misfit strain and film thickness distribution.

Turning to the sum of thin-film stresses $\sigma_{rr}^{(fi)}+\sigma_{\theta\theta}^{(fi)}$ and sum of system curvatures $\kappa_{rr}+\kappa_{\theta\theta}$, the average system curvature $\overline{\kappa_{rr}+\kappa_{\theta\theta}}$ is defined as $$\overline{\kappa_{rr}+\kappa_{\theta\theta}} = \frac{1}{\pi R^2}\int\int_A (\kappa_{rr}+\kappa_{\theta\theta})\eta \, d\eta d\theta = \frac{2}{R^2}\int_0^R \eta(\kappa_{rr}+\kappa_{\theta\theta})d\eta. \quad (2.22)$$

It can be related to the average of the product of misfit strains and film thickness by averaging both sides of Eq. (2.17), i.e., $$\overline{\kappa_{rr}+\kappa_{\theta\theta}} = -12\frac{1-v_s}{E_s h_s}\sum_{i=1}^{n}\frac{E_{f_i}}{1-v_{f_i}}\overline{h_{f_i}\varepsilon_m^{(i)}}. \quad (2.23)$$

The deviation from the average curvature, $\kappa_{rr}+\kappa_{\theta\theta}-\overline{\kappa_{rr}+\kappa_{\theta\theta}}$, is then given by $$\kappa_{rr}+\kappa_{\theta\theta}-\overline{\kappa_{rr}+\kappa_{\theta\theta}} = -6\frac{1-v_s}{E_s h_s}\sum_{i=1}^{n}\frac{E_{f_i}}{1-v_{f_i}}\left(h_{f_i}\varepsilon_m^{(i)} - \overline{h_{f_i}\varepsilon_m^{(i)}}\right). \quad (2.24)$$

Elimination of misfit strains $$\sum_{i=1}^{n}\frac{E_{f_i}}{1-v_{f_i}}\left(h_{f_i}\varepsilon_m^{(i)} - \overline{h_{f_i}\varepsilon_m^{(i)}}\right)$$

and the average $$\sum_{i=1}^{n}\frac{E_{f_i}}{1-v_{f_i}}\overline{h_{f_i}\varepsilon_m^{(i)}}$$

from Eqs. (2.23), (2.24) and (2.19) gives the sum of thin-film stresses in terms of system curvature as $$\sum_{i=1}^{n} h_{f_i}\left(\sigma_{rr}^{(fi)} + \sigma_{\theta\theta}^{(fi)}\right) = \quad (2.25)$$

$$\frac{E_s h_s^2}{6(1-v_s)}\left[\kappa_{rr}+\kappa_{\theta\theta} + \frac{1+v_s}{1+v_s}(\kappa_{rr}+\kappa_{\theta\theta} - \overline{\kappa_{rr}+\kappa_{\theta\theta}})\right].$$

It is clear that the curvatures alone for a system with all n thin films are not sufficient to determine the stresses in all thin films. Additional parameters that can be measured in experiments are needed for the complete determination of all film stresses. One possibility is the system curvatures $\kappa_{rr}^{(i)}$ and $\kappa_{\theta\theta}^{(i)}$ after the first i thin films are deposited, and $\kappa_{rr}^{(n)}=\kappa_{rr}$ and $\kappa_{\theta\theta}^{(n)}=\kappa_{\theta\theta}$. The system curvatures $\kappa_{rr}^{(i)}$ and $\kappa_{\theta\theta}^{(i)}$ can be measured during the deposition process, or after the deposition process by etching the top n-i thin films away. The stresses in the $i^{th}$ thin film are then given by $$\sigma_{rr}^{(fi)} + \sigma_{\theta\theta}^{(fi)} = \quad (2.26)$$

$$\frac{E_s h_s^2}{6(1-v_s)h_{f_i}}\left[\Delta\kappa_{rr}^{(i)} + \Delta\kappa_{\theta\theta}^{(i)} + \frac{1+v_s}{1+v_s}\left(\Delta\kappa_{rr}^{(i)} + \Delta\kappa_{\theta\theta}^{(i)} - \overline{\Delta\kappa_{rr}^{(i)}+\Delta\kappa_{\theta\theta}^{(i)}}\right)\right]$$

for non-uniform thickness $h_{f_i}\neq$constant, where $$\Delta\kappa_{rr}^{(i)}=\kappa_{rr}^{(i)}-\kappa_{rr}^{(i-1)} \text{ and } \Delta\kappa_{\theta\theta}^{(i)}=\kappa_{\theta\theta}^{(i)}-\kappa_{\theta\theta}^{(i-1)} \quad (2.27)$$

are the change of system curvatures due to the $i^{th}$ thin film, and $\kappa_{rr}^{(0)}=\kappa_{\theta\theta}^{(0)}=0$. The above equation, together with Eq. (2.21), provides the direct relation between stresses in each thin film and system curvatures. The thin-film stresses at a point depend not only on the change of system curvatures $\Delta\kappa_{rr}^{(i)}+\Delta\kappa_{\theta\theta}^{(i)}$ at the same point (local dependence), but also on the average change of system curvatures $\overline{\Delta\kappa_{rr}^{(i)}+\Delta\kappa_{\theta\theta}^{(i)}}$ in the entire system (non-local dependence).

The interface stress $\tau^{(1)}$ between the substrate and the first thin film and $\tau^{(i)}$ between thin films in Eq. (2.13) can also be given by system curvatures $$\tau^{(i)} = \frac{E_s h_s^2}{6(1-v_s^2)}\sum_{j=i}^{n}\frac{d}{dr}\left(\Delta\kappa_{rr}^{(j)}+\Delta\kappa_{\theta\theta}^{(j)}\right) = \quad (2.28)$$

$$\frac{E_s h_s^2}{6(1-v_s^2)}\frac{d}{dr}(\kappa_{rr}+\kappa_{\theta\theta} - \kappa_{rr}^{(i-1)} - \kappa_{\theta\theta}^{(i-1)}),$$

where $\kappa_{rr}^{(0)}=\kappa_{\theta\theta}^{(0)}=0$. The above equation provides a remarkably simple way to estimate the interface shear stresses from radial gradients of the two non-zero system curvatures. The shear stresses are responsible for promoting system failures through debonding of thin films.

For the limit of uniform misfit strains but non-uniform thicknesses, the previous analysis gives very simple results. The interface shear stresses in Eq. (2.13) becomes $$\tau^{(i)} = -\sum_{j=1}^{n}\frac{E_{f_j}}{1-v_{f_j}}\frac{d}{dr}(h_{f_j})\varepsilon_m^{(j)}. \quad (3.1)$$

For film thickness much less than the substrate thickness $h_f/h_s\ll 1$, $\sigma_{rr}^{(fi)}-\sigma_{\theta\theta}^{(fi)}$ is much smaller than $\sigma_{rr}^{(fi)}+\sigma_{\theta\theta}^{(fi)}$, and Eqs. (2.19) and (2.20) give $$\sigma_{rr}^{(f_i)} \approx \sigma_{\theta\theta}^{(f_i)} \approx -\frac{E_{f_i}}{1-\nu_{f_i}}\varepsilon_m^{(i)}, \quad (3.2)$$

which are approximately uniform and equi-biaxial in each thin film. The sum of curvatures in Eq. (2.17) is non-uniform, and is given by $$\kappa_{rr} + \kappa_{\theta\theta} = -12\frac{1-\nu_s}{E_s h_s^2}\sum_{i=1}^{n}\frac{E_{f_i}}{1-\nu_{f_i}}\left[\overline{h_{f_i}} + \frac{1+\nu_s}{2}(h_{f_i} - \overline{h_{f_i}})\right]\varepsilon_m^{(i)}, \quad (3.3)$$

where $$\overline{h_{f_i}} = \frac{2}{R^2}\int_0^R \eta h_{f_i} d\eta = \frac{\iint h_{f_i} dA}{\pi R^2}$$

is the average thickness of the $i^{th}$ layer of thin film. The change of system curvatures due to the $i^{th}$ thin film in Eq. (2.27) becomes $$\Delta\kappa_{rr}^{(i)} + \Delta\kappa_{\theta\theta}^{(i)} = -12\frac{1-\nu_s}{E_s h_s^2}\frac{E_{f_i}}{1-\nu_{f_i}}\left[\overline{h_{f_i}} + \frac{1+\nu_s}{2}(h_{f_i} - \overline{h_{f_i}})\right]\varepsilon_m^{(i)}. \quad (3.4)$$

Its average is $$\overline{\Delta\kappa_{rr}^{(i)} + \Delta\kappa_{\theta\theta}^{(i)}} = -12\frac{1-\nu_s}{E_s h_s^2}\frac{E_{f_i}}{1-\nu_{f_i}}\overline{h_{f_i}}\varepsilon_m^{(i)}. \quad (3.5)$$

The approximately uniform stresses in Eq. (3.2) can then be related to the above average curvature changes by $$\sigma_{rr}^{(f_i)} \approx \sigma_{\theta\theta}^{(f_i)} \approx \frac{E_s h_s^2}{6(1-\nu_s)\overline{h_{f_i}}}\frac{\overline{\Delta\kappa_{rr}^{(i)} + \Delta\kappa_{\theta\theta}^{(i)}}}{2}. \quad (3.6)$$

This is the same as the Stoney formula (1.1) except that the curvature $\kappa$ and film thickness $h_f$ are replaced by the average curvature $$\frac{\overline{\Delta\kappa_{rr}^{(i)} + \Delta\kappa_{\theta\theta}^{(i)}}}{2}$$

and average film thickness $\overline{h_{f_i}}$. This result holds for arbitrarily non-uniform film thickness, including the islands of films as illustrated in the next section.

Figure 3:
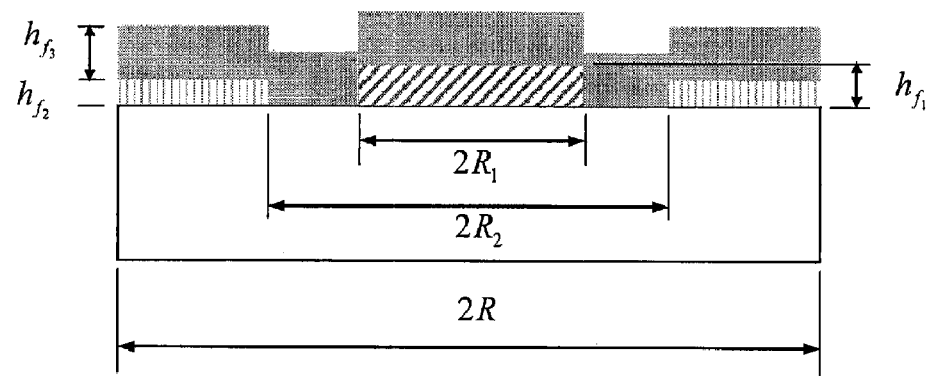
FIG. 3 is an example substrate including two islands of thin films having uniform thicknesses.

FIG. 3 shows an example of two islands of thin films with uniform thickness $h_{f_1}$ and $h_{f_2}$ on the substrate of thickness $h_s$. The two islands of thin films cover the area $r<R_1$ and $R_2<r<R$, respectively, where $R$ is the substrate radius, and $R_1<R_2<R$. A passivation layer of uniform thickness $h_{f_3}$ covers two islands of films and the substrate. The Young's modulus and Poisson's ratios of the substrate and films are $E_s, \nu_s, E_{f_i}$ and $\nu_{f_i}$ ($i=1, 2, 3$). The misfit strain in each film is uniform $\varepsilon_m^{(i)}$=constant.

The interface shear stresses in Eq. (3.1) vanish except at the boundaries of the islands of films $r=R_1$ and $r=R_2$, at which they become the concentrated shear forces. The average film thicknesses are $$\overline{h_{f_1}} = \frac{R_1^2}{R^2}h_{f_1},\; \overline{h_{f_2}} = \left(1-\frac{R_2^2}{R^2}\right)h_{f_2} \text{ and } \overline{h_{f_3}} = h_{f_3}.$$

The change of system curvatures in Eq. (3.4) becomes $$\Delta\kappa_{rr}^{(1)} + \Delta\kappa_{\theta\theta}^{(1)} = \quad (4.1)$$

$$\begin{cases} -6\frac{(1-\nu_s)^2}{E_s h_s^2}\frac{E_{f_1} h_{f_1}}{1-\nu_{f_1}}\left[\frac{1+\nu_s}{1-\nu_s}+\frac{R_1^2}{R^2}\right]\varepsilon_m^{(1)} & \text{for } 0 \le r \le R_1 \\ -6\frac{(1-\nu_s)^2}{E_s h_s^2}\frac{E_{f_1} h_{f_1}}{1-\nu_{f_1}}\frac{R_1^2}{R^2}\varepsilon_m^{(1)} & \text{for } R_1 \le r \le R, \end{cases}$$

$$\Delta\kappa_{rr}^{(2)} + \Delta\kappa_{\theta\theta}^{(2)} = \quad (4.2)$$

$$\begin{cases} -6\frac{(1-\nu_s)^2}{E_s h_s^2}\frac{E_{f_2} h_{f_2}}{1-\nu_{f_2}}\left(1-\frac{R_2^2}{R^2}\right)\varepsilon_m^{(2)} & \text{for } 0 \le r \le R_2 \\ -6\frac{(1-\nu_s)^2}{E_s h_s^2}\frac{E_{f_2} h_{f_2}}{1-\nu_{f_2}}\left[\frac{1+\nu_s}{1-\nu_s}+\left(1-\frac{R_2^2}{R^2}\right)\right]\varepsilon_m^{(2)} & \text{for } R_2 \le r \le R, \end{cases}$$

$$\Delta\kappa_{rr}^{(3)} + \Delta\kappa_{\theta\theta}^{(3)} = -12\frac{1-\nu_s}{E_s h_s^2}\frac{E_{f_3} h_{f_3}}{1-\nu_{f_3}}\varepsilon_m^{(3)} \quad \text{for } 0 \le r \le R. \quad (4.3)$$

Their averages are obtained from Eq. (3.5) as $$\overline{\Delta\kappa_{rr}^{(1)} + \Delta\kappa_{\theta\theta}^{(1)}} = -12\frac{1-\nu_s}{E_s h_s^2}\frac{E_{f_1} h_{f_1}}{1-\nu_{f_1}}\frac{R_1^2}{R^2}\varepsilon_m^{(1)}, \quad (4.4)$$

$$\overline{\Delta\kappa_{rr}^{(2)} + \Delta\kappa_{\theta\theta}^{(2)}} = -12\frac{1-\nu_s}{E_s h_s^2}\frac{E_{f_2} h_{f_2}}{1-\nu_{f_2}}\left(1-\frac{R_2^2}{R^2}\right)\varepsilon_m^{(2)}, \quad (4.5)$$

$$\overline{\Delta\kappa_{rr}^{(3)} + \Delta\kappa_{\theta\theta}^{(3)}} = -12\frac{1-\nu_s}{E_s h_s^2}\frac{E_{f_3} h_{f_3}}{1-\nu_{f_3}}\varepsilon_m^{(3)}. \quad (4.6)$$

The stress-curvature relation in Eq. (3.6) then becomes $$\sigma_{rr}^{(f_1)} \approx \sigma_{\theta\theta}^{(f_1)} \approx \frac{E_s h_s^2}{6(1-\nu_s)\overline{h_{f_1}}}\frac{\overline{\Delta\kappa_{rr}^{(1)} + \Delta\kappa_{\theta\theta}^{(1)}}}{2} = \quad (4.7)$$

$$\frac{E_s h_s^2}{6(1-\nu_s)h_{f_1}\frac{R_1^2}{R^2}}\frac{\overline{\Delta\kappa_{rr}^{(1)} + \Delta\kappa_{\theta\theta}^{(1)}}}{2},$$

$$\sigma_{rr}^{(f_2)} \approx \sigma_{\theta\theta}^{(f_2)} \approx \frac{E_s h_s^2}{6(1-\nu_s)\overline{h_{f_2}}}\frac{\overline{\Delta\kappa_{rr}^{(2)} + \Delta\kappa_{\theta\theta}^{(2)}}}{2} = \quad (4.8)$$

$$\frac{E_s h_s^2}{6(1-\nu_s)h_{f_2}\left(1-\frac{R_2^2}{R^2}\right)}\frac{\overline{\Delta\kappa_{rr}^{(2)} + \Delta\kappa_{\theta\theta}^{(2)}}}{2},$$

$$\sigma_{rr}^{(f_3)} \approx \sigma_{\theta\theta}^{(f_3)} \approx \frac{E_s h_s^2}{6(1-\nu_s)\overline{h_{f_3}}}\frac{\overline{\Delta\kappa_{rr}^{(3)} + \Delta\kappa_{\theta\theta}^{(3)}}}{2} = \quad (4.9)$$

$$\frac{E_s h_s^2}{6(1-\nu_s)h_{f_3}}\frac{\overline{\Delta\kappa_{rr}^{(3)} + \Delta\kappa_{\theta\theta}^{(3)}}}{2}.$$

The Stoney formula is extended for multi-layer thin films of non-uniform thicknesses deposited on a substrate subjected to non-uniform misfit strains. The stresses in thin films have non-local dependence on the system curvatures, i.e., the stresses at a point depending on both the system curvatures at the same point and on curvatures of all other points on the plate system. This necessitates the use of full-field methods capable of measuring curvature components over the entire surface of the plate system (or wafer) to determine the stresses in thin films. The stresses in each thin film are proportional to the change of system of curvatures due to the deposition of this film, instead of the total curvatures $\kappa_{rr}+\kappa_{\theta\theta}$. As shown in Eq. (2.26), the stresses in each film are inversely proportional to the film thickness at the same point. The results can be applied to the islands of thin films with passivation layers.

Figure 4:
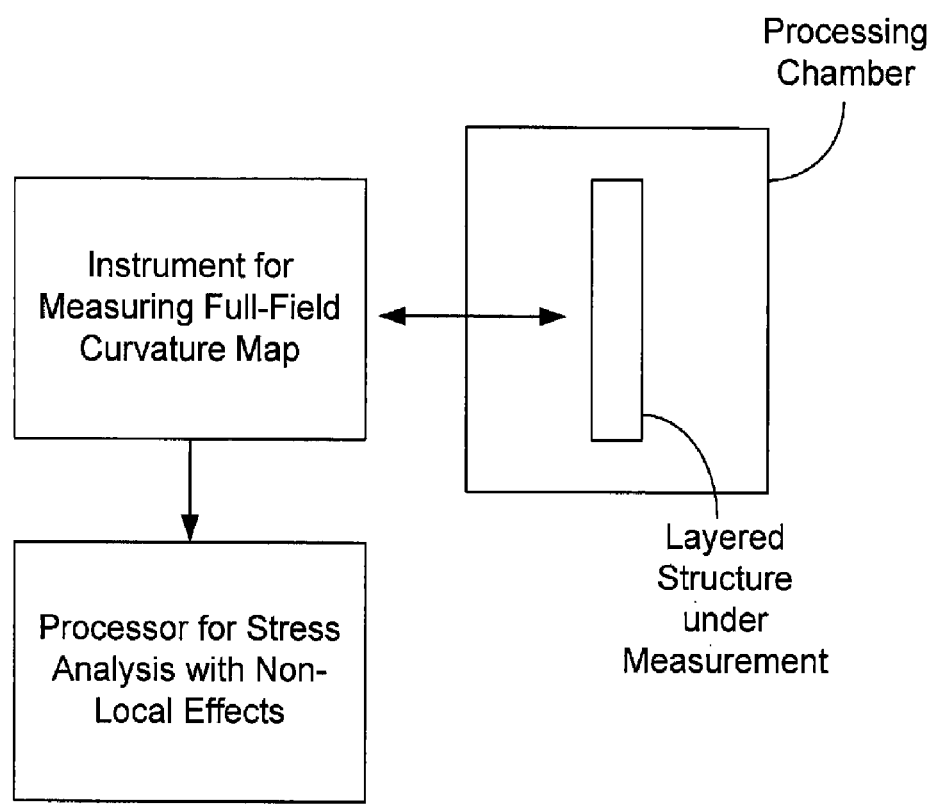
FIG. 4 is an example of a device for measuring full-field curvature maps of a sample and processing the map to analyze the stresses on the sample through a non-local analysis.

FIG. 4 shows an example of a device for measuring stresses in a structure including a substrate with multiple thin films. The layered structure includes one or more thin films formed on a thick substrate and may be held in a sample holder. An instrument or module for measuring all three of the full-field curvature component maps of one surface of the layered plate structure is implemented to probe the layered plate structure to perform the curvature measurement. As an example, the instrument can optically interact with the layered structure to measure the surface via one or more optical beams. The instrument can include an optical interferometer such as a shearing interferometer. The device in FIG. 1A further includes a processor that receives and processes the three full-field curvature component maps with two direct curvatures and the twist curvature and produces the stresses on the layered structure under measurement with both local and non-local contributions. The processor is programmed with suitable processing software instructions or routines that are described in this application. The device in FIG. 4 may be used for in-situ and real-time monitoring of a substrate or wafer under fabrication. As illustrated, the wafer may be located in a processing chamber while being measured by, e.g., an optical probe beam. Details of various exemplary implementations of the device in FIG. 4 are described in U.S. Patent Application Publication No. US 2005/00278126 A1 titled "Techniques for analyzing non-uniform curvatures and stresses in thin-film structures on substrates with non-local effects," filed on Mar. 14, 2005, the entire contents of which are incorporated herein by reference.

In implementations, the above-described techniques and their variations can be implemented as computer software instructions. Such software instructions can be stored in an article with one or more machine-readable storage media or stored in one or more machine-readable storage devices connected to one or more computers as part of the processor shown in FIG. 4. Referring back to FIG. 4, the above sections provide detailed descriptions on the processing algorithms for the processor that performs the stress analysis based on the full-field curvature map of the layered plate structure under measurement. The full-field curvature map may be obtained by various techniques. Non-invasive, full-field optical methods may be preferred since such methods are efficient and fast and may allow for real time and in situ monitoring of substrates under fabrication.

The following sections describe examples of such optical probing methods for measuring the full-field curvature map of the layered structure under test based on optical interferometry. Such optical methods can be used to achieve non-invasive, full-field measurements of patterned and unpatterned surfaces in various devices and structures. Described implementations include measurements of patterned and un-patterned surface profiles of various surfaces by using optical shearing interferometry. Optical interferometry techniques for illumination of an un-patterned backside surface of a wafer or substrate with a patterned front surface are also described. When properly configured, a surface monitoring system based on one of the disclosed optical techniques may provide full-field measurements of a surface in real time. In addition, such a surface monitoring system may provide in-situ monitoring of a wafer under processing.

In one implementation, for example, an optical probe beam with a substantially uniform wavefront may be used to illuminate a surface under measurement to produce a reflected probe beam with a reflected wavefront that carries distortions caused by an illuminated area on the surface. The reflected probe beam is directed through an optical shearing interferometer device to obtain an optical interference pattern between the reflected wavefront and another replica of the reflected wavefront that is spatially shifted by a shearing distance. Next, a phase shift between the reflected wavefront and the replica of the reflected wavefront is adjusted to obtain a plurality of phase-shifted interference patterns of different phase shifts from the optical shearing interferometer. The interference patterns are then processed to obtain information on surface slopes across the illuminated area in the surface under measurement.

In other implementations, support members may be to contact a backside surface of a wafer to hold the wafer (or of a reticle to hold the reticle, etc.). The wafer is fabricated with patterns on a front surface opposite to the backside surface. The backside surface is illuminated with a probe beam to produce a reflected probe beam with a reflected wavefront that carries distortions caused by an illuminated area on the backside surface. An optical interference pattern is then produced with the reflected probe beam to include discontinuities due to presence of support members on the backside surface. An interpolation algorithm is applied in processing the optical interference pattern to interpolate interference fringes caused by the backside surface across regions with the discontinuities to obtain interference pattern features within the illuminated area that are caused solely by the backside surface. Next, the interpolated interference pattern from the backside surface are processed to obtain surface slopes of corresponding positions on the front surface of the wafer.

Alternatively, the above interpolation in data processing may be substituted by additional measurements and processing to obtain data in the areas on the backside surface occupied by the support members. For example, without applying the interpolation, the interference pattern from the backside surface is processed to obtain surface slopes of corresponding positions on the front surface of the wafer. Next, the angular orientation of the wafer on the support members is changed at least once to obtain at least one another reflected optical probe beam from the same incident optical probe beam and thus another optical interference pattern. The other interference pattern from the backside surface is then processed to obtain surface slopes of corresponding positions on the front surface of the wafer. The surface slopes obtained from different interference patterns at different angular orientations of the wafer are then compared. The missing data found at a location in one interference pattern is filled by data at the same location in another interference pattern obtained at a different angular orientation.

This application also describes techniques for using interference patterns obtained at different shearing distances in a shearing interferometer to improve the measurements. In one implementation, for example, an optical probe beam with a substantially uniform wavefront is used to illuminate a surface under measurement to produce a new optical beam with a distorted wavefront caused by the surface. The new optical beam is directed through an optical shearing interferometer to obtain an optical interference pattern between the distorted wavefront and another replica of the distorted wavefront that is spatially shifted by a shearing distance. The shearing distance is then adjusted to obtain optical interference patterns at different shearing distances. These interference patterns at different shearing distances are processed to extract information on the surface under measurement.

In the above example, two interference patterns with two different shearing distances may be subtracted to produce a differentiated interference pattern that corresponds to a new shearing distance equal to a difference between the two different shearing distances. This technique can be used to obtain data at a small shearing distance that may be difficult to achieve with the given shearing interferometer.

This application further describes a number of shearing interferometers different from a coherent gradient sensing (CGS) system for measuring surfaces. These non-CGS shearing interferometers may have certain advantages over CGS in specific applications.

Optical shearing interferometers produce and interfere two spatially shifted replicas of the same, usually distorted wavefront of an optical beam along a direction transverse to the direction of propagation of the said wavefront. For example, transverse and radial shearing interferometers may be used. The interference between the spatially shifted replicated wavefronts generates an interference pattern representing the spatial distribution of slopes in the wavefront. In effect such interferometers perform an optical differentiation of the wavefront. In some of the examples for optically measuring surfaces described in this application, at least one optical shearing interferometer may be used to optically measure a surface by illuminating the surface with a collimated probe beam. The shearing interferometer may be configured to produce a shearing interference pattern from either of the optical transmission of the probe beam through the surface or from the optical reflection of the probe beam by the surface. The shearing interference pattern is then processed to obtain surface, slopes, curvatures and other surface topographical information. For example, surface topography on the global profile of the surface and nanotopography on the local profile of the surface may be obtained from the shearing interferometer. Examples of measurable surfaces include but are not limited to surfaces in various panels and plates, various substrates and wafers, integrated electronic circuits, integrated optical devices, opto-electronic circuits, and micro-electro-mechanical systems (MEMs), flat panel display systems (e.g., LCD and plasma displays), and photolithography masks, pellicles and reticles.

The use of optical shearing interferometry presents certain advantages in optically measuring surfaces. Optical hearing interferometry may be an effective measuring tool for surfaces patterned with various microstructures such as patterned wafers and patterned mask substrates. In addition, an optical shearing interferometer may be used for in-situ monitoring of the surface properties such as curvatures and related stresses during fabrication of devices at the wafer level and the measurements may be used to dynamically control the fabrication conditions or parameters in real time. As an example, measurement and operation of an optical shearing interferometer generally is not significantly affected by rigid body translations and rotations due to the self-referencing nature of the optical shearing interferometry. Hence, a wafer or device under measurement may be measured by directing a probe beam substantially normal to the surface or at low incident angles without affecting the measurements. By shifting or shearing the wavefront, the optical shearing interferometer measures the deformation of one point of the wavefront to another separated by the shearing distance, i.e., the distance between the two interfering replicas of the same wavefront. In this sense, the optical shearing interferometer is self referencing and thus increases its insensitivity or immunity to vibrations of the wafer or device under measurement. This resistance to vibrations may be particularly advantageous when the measurement is performed in a production environment or in situ during a particular process (e.g. deposition within a chamber), where vibration isolation is a substantial challenge.

As a comparison, many non-shearing interferometers generate wavefront interference of topology or topography (surface elevation) based on optical interference between a distorted wavefront reflected from a sample surface and an undistorted, reference wavefront reflected from a known reference surface. The use of such non-shearing optical interferometers for measuring patterned surfaces may be ineffective because, in many cases, the relatively non-uniform or diffuse wavefront reflected off the patterned surface may not interfere with fidelity with the wavefront reflected off the reference surface due to, e.g., the loss of light diffracted or scattered by the pattern into large angles. Also, a patterned surface may have substantially different reflective properties, e.g., certain areas of the patterned surface are highly absorbing at the probe wavelength than other areas of the patterned surface or the reference surface. In these and other circumstances, it may be difficult to unwrap and interpret the interferometric images produced by such non-shearing interferometers in the presence of extensive patterning.

Another feature of the shearing interferometry is that the wavefront is optically differentiated once and the optical differentiation is recorded in the shearing interference pattern. Hence, only a single derivative operation on the data from the shearing interference pattern is sufficient to calculate curvatures from slopes of the wavefront. This reduces the amount of computation in processing the interference data and thus reduces the time for data processing. Also, because the shearing interferometry method provides full-field interferometric data it can utilize many more data points compared to other methods such as the method of using a conventional capacitive probe to measure a few points (e.g., 3 points) of surface topology. This higher data density provides more accurate measurements and better resistance to noise than other methods which feature much less density of measured data. In addition, although various laser beam scanning tools may be used to measure wafer bow or surface curvature, these methods typically measure radial curvature only. Shearing interferometry may be easily implemented to measure surface slopes in two orthogonal directions (X and Y) within the surface and thus allow for elucidation of the full curvature tensor and the associated stress states of the wafer or substrate.

In applying shearing interferometry for measuring patterned surfaces on wafers and other structures (e.g. patterned mask elements), the patterned wafers, e.g., semiconductor and optoelectronic wafers with diameters of 200 mm, 300 mm or other wafer sizes may be placed in a shearing interferometer in a configuration that allows a collimated probe beam to be reflected off the wafer surface. The shearing interferometer uses the reflected probe beam from the wafer surface to produce the two interfering wavefronts, which are substantially similar in shape after being sheared by a small shearing distance. Hence, the interference between the two wavefronts produces coherent interference. Although each wavefront reflected off a patterned surface may be inherently noisy and diffuse, sufficient coherence exists between the wavefronts to produce meaningful fringe patterns and can be interpreted to extract surface information.

Figure 5:
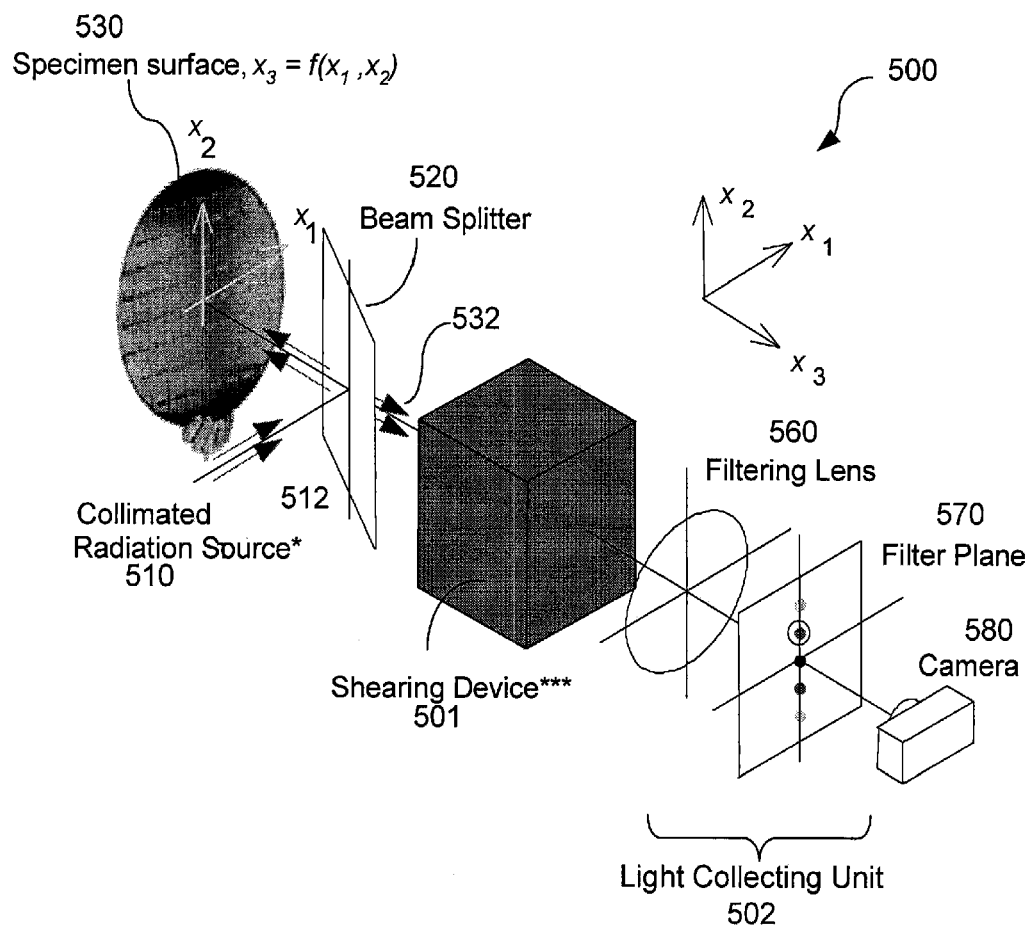
FIG. 5 is a system with a shearing device for measuring a surface according to one implementation.

FIG. 5 illustrates one implementation of a system 500 for measuring a specimen surface 530 based on optical shearing interferometry. A light source 510 is provided to produce a collimated probe beam 512 with a substantially uniform wavefront. The light source 510 may produce radiation in a wide range spectral ranges including visible and invisible wavelengths (e.g., IR and UV radiation). The light from the source 510 may be coherent. Some interferometers, such as a CGS device, may also operate with incoherent light. This probe beam 512 is directed to illuminate the surface 530 and to produce a reflected probe beam 532. An optical element 520 such as a beam splitter may be used to direct the probe beam 510 to the surface 530 and to transmit the reflected probe beam 532. A shearing device 501, i.e., an optical shearing interferometer, is placed in the optical path of the reflected probe beam 532 to generate a shearing interference pattern from the reflected probe beam 532. Oblique incidence of the collimated beam 512 onto the reflective surface 530 may also be used and the beamsplitter element 520 is bypassed. In general, any shearing interferometer may be used to implement the shearing device 501. In actual applications, different shearing configurations may have unique features or attributes and hence are different from one another in this context. Examples of the shearing device 501 include a coherent gradient sensing (CGS) system using optical gratings to cause the shearing of the wavefront, a radial shear interferometers, wedge plate in a Bi-Lateral Shearing Interferometer (U.S. Pat. No. 5,710,631), the entire contents of which are incorporated herein by reference, and others, some of which are described in the US Patent Application Publication US 2005/0278126.

Referring back to FIG. 4, the system 500 may be used to measure surfaces of a variety of wafers, substrates, flat panels or lithographic mask elements. The system 500 can simultaneously measure each and every point in the illuminated area on the specimen surface to obtain information on the flatness, topography, slope, curvature and stress. The shearing interferometry may be especially advantageous in measuring patterned surfaces such as microfabricated surfaces commonly found in semiconductor or optoelectronics wafers and substrates. The shearing device 501 may produce coherent or semi-coherent interference on a patterned surface.

Figure 6:
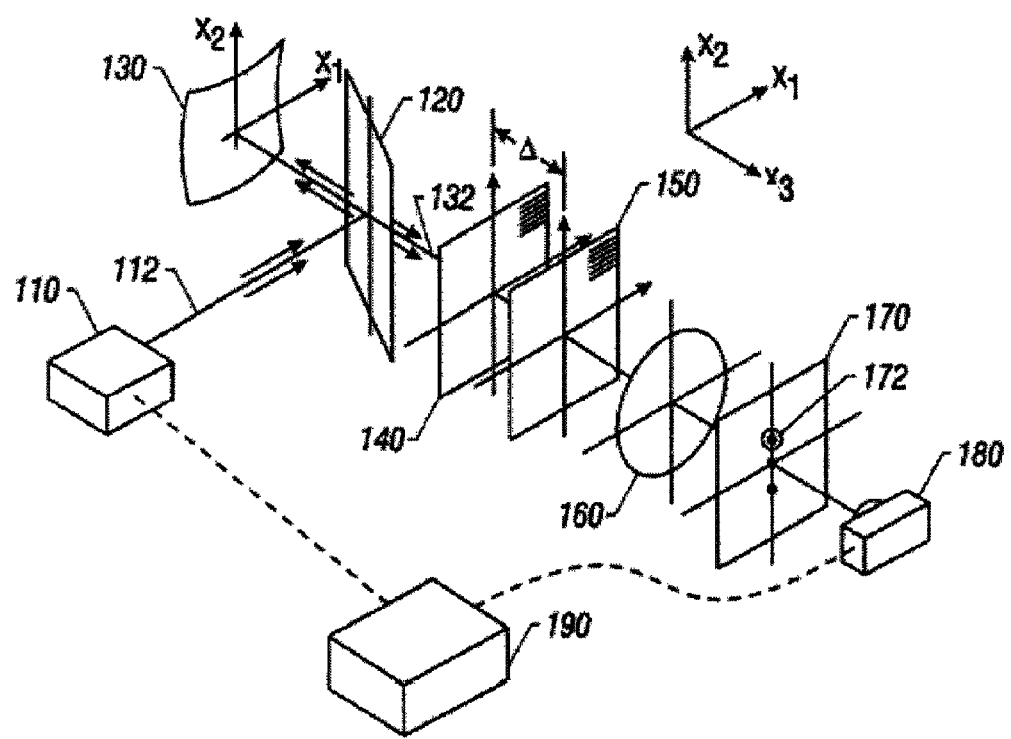
FIG. 6 is an example of a coherent gradient sensing system.

As an example, FIG. 6 shows an exemplary implementation of a coherent gradient sensing ("CGS") system 300 based on the system design in FIG. 5. Certain aspects of the system 300 are described in U.S. Pat. No. 6,031,611 to Rosakis et al., which is incorporated herein by reference. The CGS system 300 uses a collimated coherent optical beam 112 from a light source 110 as an optical probe to obtain surface slope and curvature information indicative of a specularly reflective surface 130 formed of essentially any material. An optical element 120 such as a beam splitter can be used to direct the beam 112 to the surface 130. When the reflective surface 130 is curved, the wavefront of the reflected probe beam 132 is distorted and thereby the reflected probe beam 132 acquires an optical path difference or phase change associated with the surface topographic of the surface 130 under measurement. This system produces a "snapshot" of each point within the illuminated area on the surface 130 and hence the surface topographic information at any point along any direction within the illuminated area can be obtained. This can eliminate the need for measuring one point at a time in a sequential manner by scanning a probe beam one point at a time across the surface 130.

Two optical diffraction elements such as optical diffraction gratings 140 and 150 spaced from each other by Δ are placed in the path of the reflected probe beam 132 to manipulate the distorted wavefront for curvature measurement. Two diffraction components produced by the second grating 150 from diffraction of two different diffraction components produced by the first grating 140 are combined, by using an optical element 160 such as a lens, to interfere with each other. When a lens is used as the optical element, the two diffracted beams produced by the second grating 150 and combined by the lens have the same diffraction angle out of the second grating 150 and thus are parallel to each other. The diffraction by the two gratings 140 and 150 effectuates a relative spatial displacement, i.e., a lateral spatial shift, between the two selected diffraction components. This shift is a function of the spacing Δ between the two gratings 140 and 150 when other grating parameters are fixed. More specifically, the shearing distance is ($\Delta \times \tan \theta$), where θ is the diffraction angle of two interfering diffraction beams. Hence, the gratings 140 and 150 produce two spatially shifted wavefronts from the same wavefront of the reflected probe beam 132. A spatial filter 170 is placed relative to the optical element 160 to transmit the interference pattern of the selected diffraction components and to block other diffraction orders from the second grating 150. In general, any desired diffraction order or combination of orders may be selected for the measurements.

The transmitted interference pattern is then captured by an imaging sensor 180 which may include an array of sensing pixels, such as a CCD array, to produce an electrical signal representing the interference pattern. A signal processor 190, processes the electrical signal to extract a spatial gradient of the wavefront distortion caused by the topography of the reflective surface 130. This spatial gradient, in turn, can be further processed to obtain the curvature information and hence a curvature map of the illuminated area on the surface 130 can be obtained. A single spatial differentiation is performed on the interference pattern to measure the surface gradient. This technique can provide accurate measurements of surface curvatures and the accuracy is high when the curvature variation of the surface is gradual, i.e., when the out-of-plane displacement is less than the thickness of the film, the line or the substrate. This technique is insensitive to rigid body motions in contrast to some other interferometric techniques. Details of this data processing operation are described in the U.S. Pat. No. 6,031,611 titled "Coherent gradient sensing method and system for measuring surface curvature" to Rosakis et al, the entire content of which is incorporated herein by reference. Upon completing the processing for the surface slopes and curvatures, the processor 190 further operates to compute the stresses from the surface curvatures.

The two gratings 140 and 150 in general may be any gratings, with different grating periods and oriented with respect to each other at any angle. Preferably, the two gratings may be oriented with respect to each other in the same direction and may have the same grating periods to simplify the data processing. In this case, the grating direction is essentially set by the direction of the relative spatial displacement ("shearing") between the two selected diffraction components due to the double diffractions by the gratings 140 and 150.

Certain applications may require spatial shearing in two different directions to obtain a full-field two-dimensional slope and curvature measurement. This may be done by using the CGS system 300 to perform a first measurement when the sample surface 130 is at a first orientation and subsequently to perform a second measurement when the sample surface 130 is rotated to a second orientation (e.g., perpendicular to the first orientation).

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, in some implementations, relations between the film stresses and misfit strains, and between the system curvatures and the misfit strains can be derived using a similar analysis. Each of these parameters features a non-local dependence on curvature, which makes a full-field measurement important for the experimental inference of stresses. The analysis relates to a system composed of multi-layer thin films on a substrate subjected to non-uniform misfit strain distribution. In this analysis, the stress in each film and system curvature are related to the misfit strain distribution, and a relation between the stress in each film and system curvature is derived, where the relation allows for the accurate experimental inference of film stresses from full-field and real-time curvature measurements. Further, in this analysis, the Stoney formula is extended for a multi-layer thin film/substrate system subjected to non-uniform misfits by establishing the direct relation between the stresses in each thin film and system curvatures. This produces a simple way to estimate the interface shear stresses from radial gradients of the two non-zero system curvatures. The shear stresses are responsible for promoting system failures through debonding of thin films. The analysis is further extended to a system of multi-layer thin films deposited on a substrate to arbitrary non-uniform misfit strains where a direct relation between the stresses in each thin film and system curvatures is established. In this manner, the analysis provides a way to estimate the interface shear stresses from the gradients of system curvatures that display a non-local dependence.

What is claimed is:

1. A computer-implemented method to determine stress in a multi-layer thin film system, the method comprising:
for a system comprising a substrate with a plurality of films layered thereon, determining film stresses in the plurality of films, interface shear stresses at a substrate-film interface and film-film interfaces and system curvatures in terms of contributions of misfit strains and thicknesses of the plurality of films;
using a relationship between the contributions of the misfit strains and the system curvatures to express the film stresses in the plurality of films and the interface shear stresses at the substrate-film interface and film-film interfaces in terms of the system curvatures and the thicknesses of the plurality of films; and
transmitting the film stresses in the plurality of films and the interface shear stresses at the substrate-film interface and film-film interfaces expressed in terms of the system curvatures and the thicknesses of the plurality of films to a computer-readable medium,
wherein expressing the film stresses in the plurality of films and the interface shear stresses at the substrate-film interface and film-film interfaces in terms of the system curvatures and the thicknesses of the plurality of films comprises determining a solution for a linear elastic constitutive model developed based on Stoney's formula and determining forces and bending moments in the substrate from the linear elastic constitutive model.

2. The method of claim 1, further comprising developing a relationship between misfit strains and system curvatures.

3. The method of claim 1, further comprising determining a sum of the film stresses in the plurality of films in terms of the system curvatures.

4. The method of claim 1, wherein expressing the interface shear stresses at the substrate-film interface in terms of the system curvatures and the thicknesses of the plurality of films comprises determining an interface shear stress between the substrate and a first one of the plurality of films.

5. The method of claim 1, wherein the plurality of films on the substrate of the system are arranged to form one or more islands of films, wherein a given island of film comprises films layered on a region that occupies less than all of the substrate surface.

6. The method of claim 5, wherein a thickness of a film on an island is uniform.

7. The method of claim 1, wherein the thicknesses of the plurality of films are different for at least two of the plurality of films.

8. A computer program product, tangibly embodied on a computer-readable medium, causing data processing apparatus to perform operations comprising:
for a system comprising a substrate with a plurality of films layered thereon, determining film stresses in the plurality of films, interface shear stresses at a substrate-film interface and film-film interfaces and system curvatures in terms of contributions of misfit strains and thicknesses of the plurality of films;
using a relationship between the contributions of the misfit strains and the system curvatures to express the film stresses in the plurality of films and the interface shear stresses at the substrate-film interface and film-film interfaces in terms of the system curvatures and the thicknesses of the plurality of films; and
transmitting the film stresses in the plurality of films and the interface shear stresses at the substrate-film interface and film-film interfaces expressed in terms of the system curvatures and the thicknesses of the plurality of films to a computer-readable medium,
wherein expressing the film stresses in the plurality of films and the interface shear stresses at the substrate-film interface and film-film interfaces in terms of the system curvatures and the thicknesses of the plurality of films comprises determining a solution for a linear elastic constitutive model developed based on Stoney's formula and determining forces and bending moments in the substrate from the linear elastic constitutive model.

9. The computer program product of claim 8, further comprising developing a relationship between misfit strains and system curvatures.

10. The computer program product of claim 8, further comprising determining a sum of the film stresses in the plurality of films in terms of the system curvatures.

11. The computer program product of claim 8, wherein expressing the interface shear stresses at the substrate-film interface in terms of the system curvatures and the thicknesses of the plurality of films comprises determining an interface shear stress between the substrate and a first one of the plurality of films.

12. The computer program product of claim 8, wherein the plurality of films on the substrate of the system are arranged to form one or more islands of films, wherein a given island of film comprises films layered on a region that occupies less than all of the substrate surface.

13. The computer program product of claim 12, wherein a thickness of a film on an island is uniform.

14. The computer program product of claim 8, wherein the thicknesses of the plurality of films are different for at least two of the plurality of films.

15. A system comprising:
a processor; and
a computer program product encoding computer-readable instructions to cause the processor to perform operations comprising:
for a system comprising a substrate with a plurality of films layered thereon, determining film stresses in the plurality of films, interface shear stresses at a substrate-film interface and film-film interfaces and system curvatures in terms of contributions of misfit strains and thicknesses of the plurality of films;
using a relationship between the contributions of the misfit strains and the system curvatures to express the film stresses in the plurality of films and the interface shear stresses at the substrate-film interface and film-film interfaces in terms of the system curvatures and the thicknesses of the plurality of films; and
transmitting the film stresses in the plurality of films and the interface shear stresses at the substrate-film interface and film-film interfaces expressed in terms of the system curvatures and the thicknesses of the plurality of films to a computer-readable medium, wherein expressing the film stresses in the plurality of films and the interface shear stresses at the substrate-film interface and film-film interfaces in terms of the system curvatures and the thicknesses of the plurality of films comprises determining a solution for a linear elastic constitutive model developed based on Stoney's formula and determining forces and bending moments in the substrate from the linear elastic constitutive model.

16. The system of claim 15, further comprising developing a relationship between misfit strains and system curvatures.

17. The system of claim 15, further comprising determining a sum of the film stresses in the plurality of films in terms of the system curvatures.

18. The system of claim 15, wherein expressing the interface shear stresses at the substrate-film interface in terms of the system curvatures and the thicknesses of the plurality of films comprises determining an interface shear stress between the substrate and a first one of the plurality of films.

19. The system of claim 15, wherein the plurality of films on the substrate of the system are arranged to form one or more islands of films, wherein a given island of film comprises films layered on a region that occupies less than all of the substrate surface.

20. The system of claim 19, wherein a thickness of a film on an island is uniform.

21. The system of claim 15, wherein the thicknesses of the plurality of films are different for at least two of the plurality of films.

* * * * *

UNITED STATES PATENT AND TRADEMARK OFFICE
CERTIFICATE OF CORRECTION

PATENT NO. : 7,930,113 B1
APPLICATION NO. : 12/105238
DATED : April 19, 2011
INVENTOR(S) : Yonggang Huang and Ares J. Rosakis It is certified that error appears in the above-identified patent and that said Letters Patent is hereby corrected as shown below:

On the Title Page, in Field (56), under "OTHER PUBLICATIONS", in Column 2, Line 1, delete "M.," and insert -- M.A., --, therefor.

On the Title Page, in Field (57), under "ABSTRACT", in Column 2, Line 6, delete "thicknesses" and insert -- thicknesses of --, therefor.

On Page 2, in Field (56), under "OTHER PUBLICATIONS", in Column 1, Line 12, delete "Nonuniform" and insert -- Non-Uniform --, therefor.

On Page 2, in Field (56), under "OTHER PUBLICATIONS", in Column 2, Line 7, delete "Sci," and insert -- Sci., --, therefor.

In Column 7, Line 23, delete " $h_f \Box h_s,$ " and insert -- $h_f, h_s,$ --, therefor.

In Column 7, Line 57, delete " $h_f \Box h_s,$ " and insert -- $h_f, h_s,$ --, therefor.

In Column 8, Line 50, Equation (2.18), delete " $-6\dfrac{1-v_s}{E_s h_s^2}$ " and insert -- $-6\dfrac{1-v_s^2}{E_s h_s^2}$ --, therefor.

Signed and Sealed this
Twenty-seventh Day of December, 2011

David J. Kappos
*Director of the United States Patent and Trademark Office*

CERTIFICATE OF CORRECTION (continued)
U.S. Pat. No. 7,930,113 B1

In Column 8, Line 62, Equation (2.20), delete "$\dfrac{1-v_s}{E_s h_s}$" and insert -- $\dfrac{1-v_s^2}{E_s h_s^2}$ --, therefor.

In Column 9, Line 10, delete "$\int_0^r \eta(h_{f_i} \varepsilon_m^{(j)}) d\eta$" and insert -- $\int_0^r \eta\left(h_{f_i} \varepsilon_m^{(i)}\right) d\eta$ --, therefor.

In Column 9, Lines 35-40, Equation (2.23), delete "$\dfrac{1-v_s}{E_s h_s}$" and insert -- $\dfrac{1-v_s^2}{E_s h_s^2}$ --, therefor.

In Column 9, Lines 45-50, Equation (2.24), delete "$\dfrac{1-v_s}{E_s h_s}$" and insert -- $\dfrac{1-v_s^2}{E_s h_s^2}$ --, therefor.

In Column 10, Lines 5-7, Equation (2.25), delete "$\dfrac{1+v_s}{1+v_s}$" and insert -- $\dfrac{1-v_s}{1+v_s}$ --, therefor.

In Column 10, Lines 22-25, Equation (2.26), delete "$\dfrac{1+v_s}{1+v_s}$" and insert -- $\dfrac{1-v_s}{1+v_s}$ --, therefor.

In Column 10, Line 26, delete "constant ," and insert -- constant, --, therefor.

In Column 13, Lines 62-63, delete "unpatterned" and insert -- un-patterned --, therefor.

In Column 13, Line 66, delete "interferomety." and insert -- interferometry. --, therefor.